United States Patent [19]

Mims

[11] Patent Number: 5,287,953
[45] Date of Patent: Feb. 22, 1994

[54] FLIP-SLIDE APPARATUS

[75] Inventor: Herman D. Mims, Ellenboro, N.C.

[73] Assignee: Machine Builders and Design Inc., Shelby, N.C.

[21] Appl. No.: 837,946

[22] Filed: Feb. 20, 1992

[51] Int. Cl.$^5$ .............................................. B65G 47/24
[52] U.S. Cl. ...................................... 198/374; 198/399
[58] Field of Search ................................ 198/374, 399

[56] References Cited

U.S. PATENT DOCUMENTS

| | | | |
|---|---|---|---|
| 2,549,772 | 4/1951 | Carroll | 198/374 |
| 3,209,889 | 10/1965 | Metzger | 198/374 |
| 3,286,813 | 11/1966 | Fuhrimann | 198/399 |
| 3,501,036 | 3/1970 | Calistrat | 198/374 X |
| 3,575,277 | 4/1971 | Kilner | 198/399 |
| 3,642,114 | 2/2972 | Crispe et al. | 198/374 |
| 3,826,290 | 7/1974 | Pfaffle | 198/374 X |
| 4,067,433 | 1/1978 | Phipps | 198/374 |

Primary Examiner—D. Glenn Dayoan
Attorney, Agent, or Firm—Sughrue, Mion, Zinn, Macpeak & Seas

[57] ABSTRACT

The present invention provides an apparatus for receiving, in an infeed section, a stream of distributed articles, such as food items, deposited in rows of like position. A slide mechanism is used to retard the motion of the items as they drop off the infeed section. In particular, the slide mechanism is alternately moveable between a slide position and a flip position. In the slide position, the item drops off the edge of the belt and slides across the primary slide surface and onto a second slide mechanism having a secondary slide surface that is positioned to be in substantially the same plane as the primary slide surface. The slide mechanism is moved into the flip position for every other row of items. The items to be flipped come off the conveyor belt and come into contact with an abutting surface. This surface changes the direction of the item as it moves towards the transport mechanism in conjunction with a reverse slide surface of the second slide mechanism. The item slides down the reverse slide surface on its top surface, thus flipping over at least 180° from its orientation on the infeed conveyor belt. As a result a plurality of rows can be conveyed by the transport mechanism to the filling and capping stations of an automatic sandwich making system, wherein alternate rows of food items are oriented with their bottom surfaces facing upwards from the surface of the transport mechanism.

7 Claims, 5 Drawing Sheets

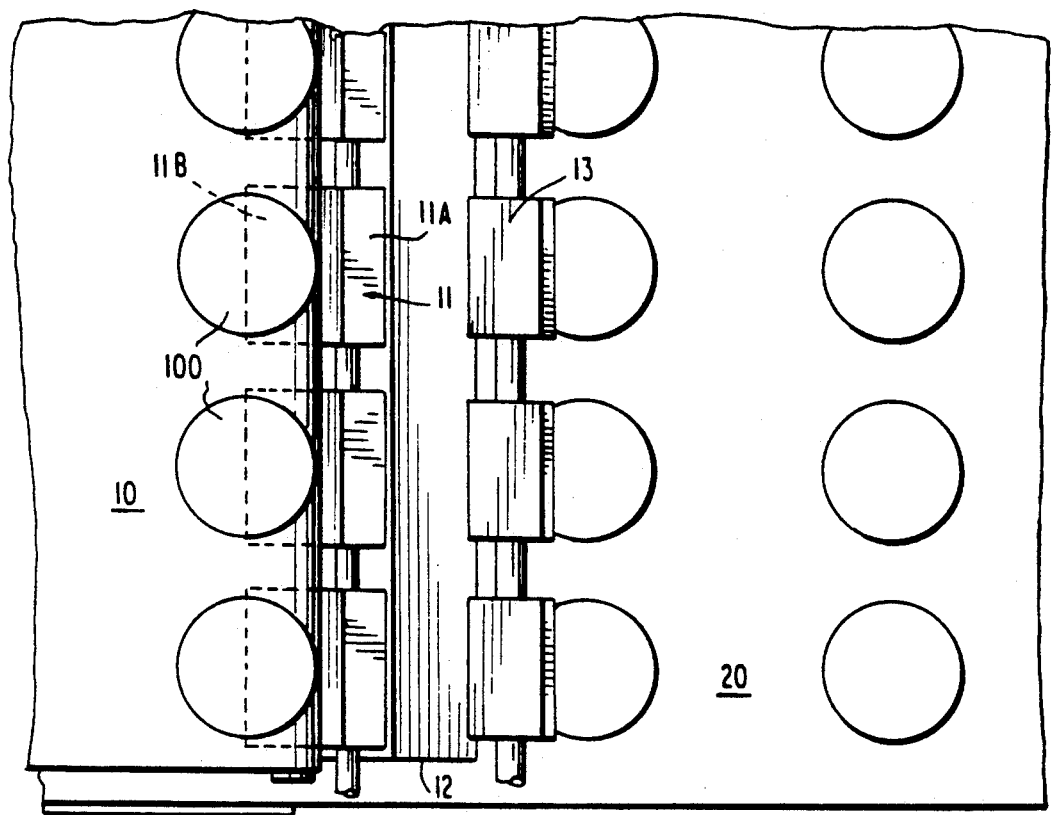
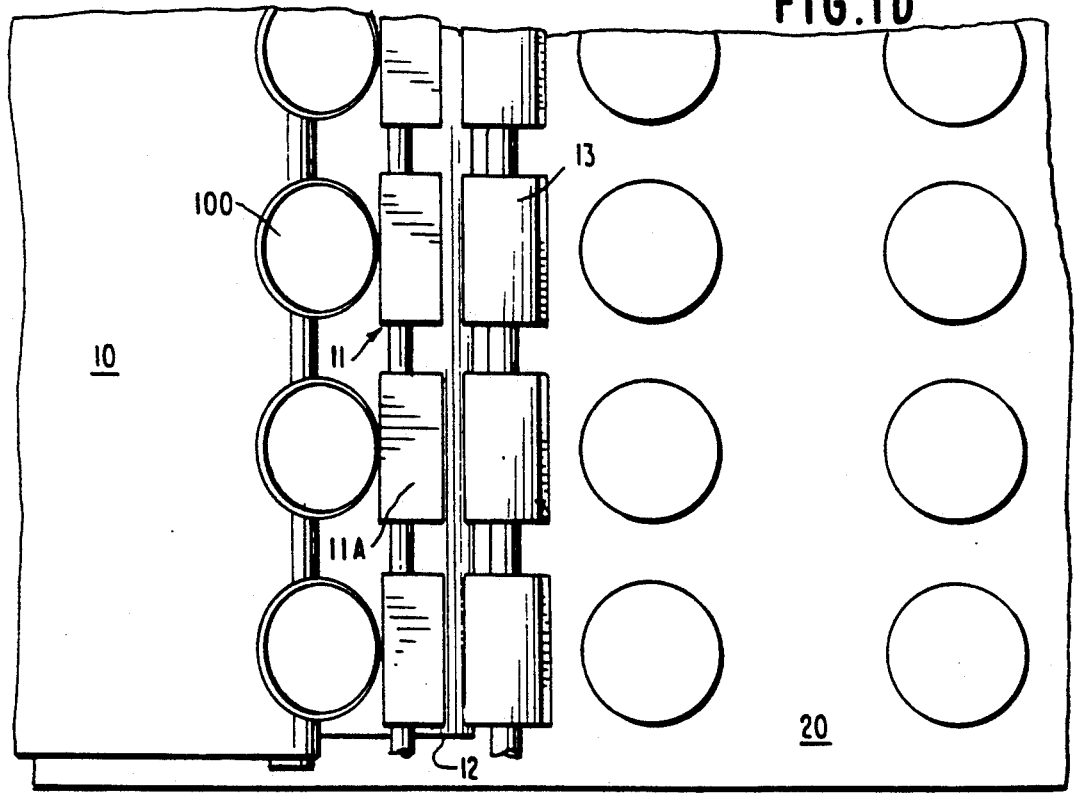
FIG.1C
FIG.1D

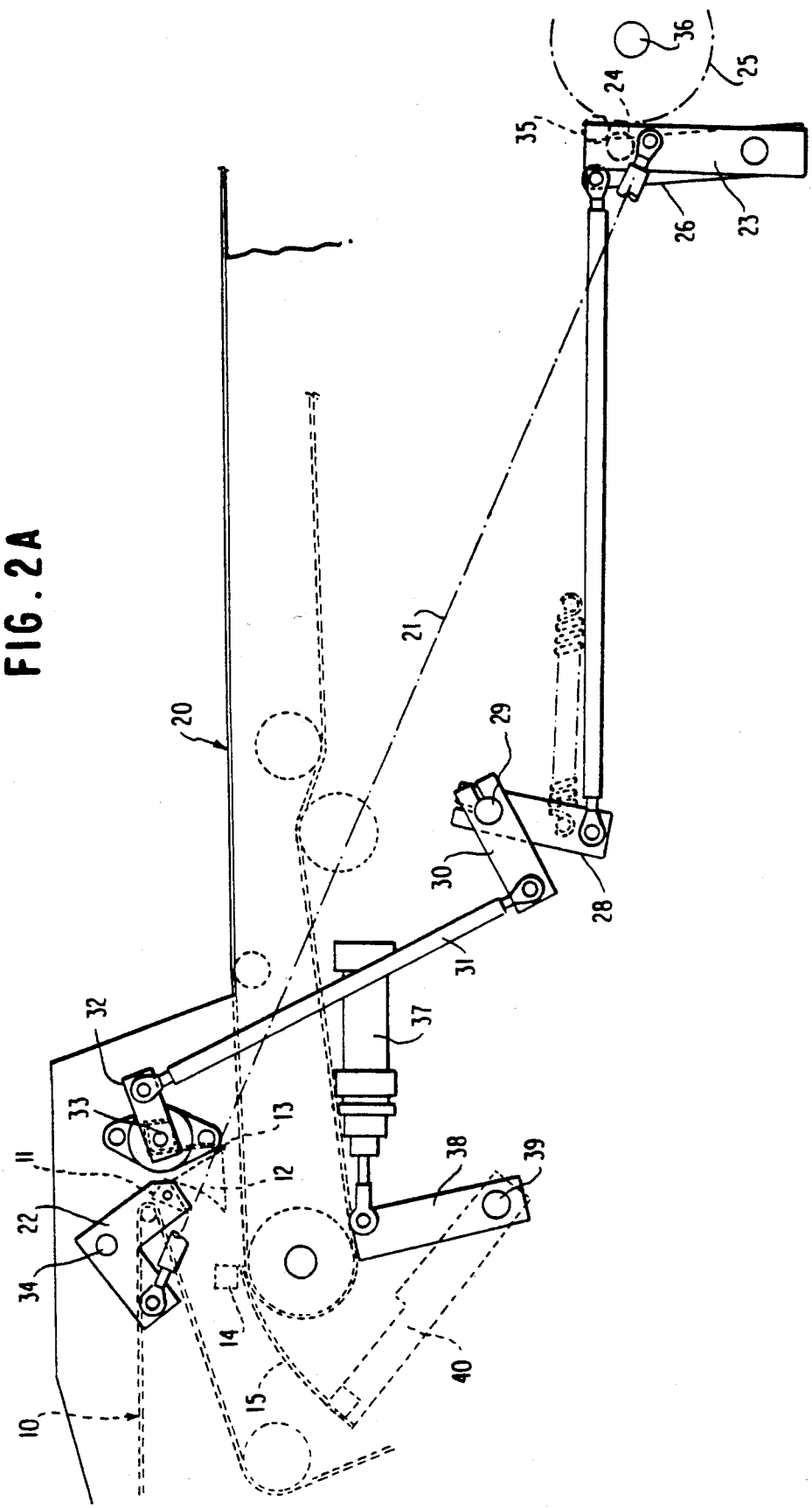

FLIP-SLIDE APPARATUS

BACKGROUND OF THE INVENTION

1. Field of the Invention

The invention pertains to an apparatus for flipping articles. In particular, the invention relates to an apparatus for flipping articles from a stream of such articles so that the articles can be transported to a manufacturing process after having been flipped over at least 180° from an initial position within the stream. The invention is particularly useful in manufacturing food articles, such as cookie sandwiches, and the like, wherein it is necessary to flip every other cookie in a stream of cookies released from a baking process so that an automatic cookie process can easily manufacture cookie sandwiches.

2. Prior Art

In the preparation of food articles such as cookies, candies, and the like, after the cookies have been baked, they are transferred from an oven to an infeed conveyor belt in a stream-like manner so as to be conveyed thereby to a processing station. Where the process is for making cookie sandwiches, a filling station is required to deposit a cookie filling substance, such as cream onto every other cookie in the stream. It was the prior practice in the baking industry to manually remove an unfilled cookie from the conveyor belt and place it on the cookie having the filling substance deposited thereon. Obviously, such practice is rather labor-intensive and time consuming.

U.S. Pat. No. 4,194,443 to Mims, the inventor of the present invention, discloses a successfully automated process of producing cookie sandwiches. The patented system, known as the COOKIE CAPPER TM sandwich system, automatically transfers cakes or cookies from the oven's supply conveyor belt to an infeed belt of the system. The system then alternately flips every other row of cakes or cookies 42 by allowing the article to drop from the infeed conveyor belt 20 to a second conveyor belt 24 while flipping over by 180° to land on its reverse surface, as shown in FIG. 3A. Cookies (T) that are to be placed on the top of the sandwich are allowed to slide down a planar surface 72 to the second conveyor without being flipped over, as shown in FIG. 3B. The disclosed system transfers the rows of cookies, equally spaced by a distance "P," to a depositing station where a filling substance is deposited onto every other row of cookies, corresponding to the flipped rows of cookies (B). A capper station, located further downstream of the second conveyor, lifts the cookies serving as the top of the sandwich and places them onto the filling substance.

The COOKIE CAPPER TM sandwich system, however, has no control over the manner in which the cookie bottom B is flipped from the infeed conveyor belt. As the speed of the infeed belt is increased the cookie bottom B is projected a distance "d" farther from the edge of the belt 20 onto the second conveyor belt 24, as shown in FIG. 4. On the other hand, the cookie top T, which is allowed to slide from the infeed belt 20 to the second belt 24, is not projected the same distance "d." Thus, the spacing between the cookie top T and cookie bottom B becomes irregular, and thus inhibits the system from increasing its throughput.

SUMMARY OF THE INVENTION

It is an object of the present invention to provide an apparatus for controlling the flip of an article during a manufacturing process.

It is an object of the present invention to provide an apparatus for automatically conveying, flipping, placing and capping articles, such as cookies, cakes, candies, and the like, so that the articles can be produced during high-speed runs.

The present invention achieves the foregoing and other objects by providing an apparatus for receiving, in an infeed section, a stream of distributed articles, such as food items and the like, deposited in rows of like position; that is, each item has a top and bottom surface, and each row is oriented such that the items have the top surface facing upwards from a conveyor belt in the infeed section. The items are allowed to drop off the edge of the infeed section towards a transport mechanism, such as an endless loop conveyor belt and the like. A slide mechanism is used to retard the motion of the items as they drop off the infeed section.

In particular, the slide mechanism is alternately moveable from a slide position to a flip position. In the slide position, a primary sliding surface of the mechanism is positioned directly below the edge of the infeed conveyor belt such that the surface forms an angle with the horizontal plane of the belt. In operation, the item drops off the edge of the belt and slides across the primary slide surface and onto a second slide mechanism having a secondary slide surface that is positioned to be in substantially the same plane as the primary slide surface. The item continues to slide along the secondary surface until it comes to rest at a junction formed by the secondary surface and a snubber bar stretching the entire width of the secondary slide surface.

In the flip position, the slide mechanism is positioned directly in front of the conveyor belt edge. The slide mechanism has an abutting surface that faces the belt edge when the items are dropped from the conveyor belt. In operation, the slide mechanism is moved into the flip position for every other row of items. The items to be flipped come off the conveyor belt and come into contact with the abutting surface. This surface changes the direction of the item as it moves towards the transport mechanism in conjunction with a reverse slide surface of the second slide mechanism. The item slides down the reverse slide surface on its top surface, thus flipping over at least 180° from its orientation on the infeed conveyor belt.

In the preferred embodiment, the item, having been flipped at least 180°, comes to rest at a junction formed between a bump bar, which is horizontally positioned above the surface of the transport mechanism, and a pull-slide plate, slideably connected thereto. The pull-slide plate and the snubber bar are moved in a timed relation so as to respectively release the items temporarily held thereby onto the transport mechanism. As a result, a plurality of parallel rows can be conveyed at a rapid pace by the transport mechanism to the filling and capping stations of an automatic sandwich making system, wherein alternate rows of food items are oriented with their bottom surfaces facing upwards from the surface of the transport mechanism.

BRIEF DESCRIPTION OF THE DRAWINGS

FIGS. 1C and 1D are top views of FIGS. 1A and 1B, respectively, showing a plurality of rows of advancing cookies.

FIGS. 2A and 2B illustrate the cam and linkage mechanisms used in the preferred embodiment of the invention.

DETAILED DESCRIPTION OF THE PREFERRED EMBODIMENTS

FIGS. 1A through 2B particularly illustrate the apparatus of the present invention by which every other article within a stream of articles is flipped at least 180° from its original orientation in the stream. The articles hereinafter described are in the form of food items, such as cookies, cakes, candies, or the like. Use of such food items in the following description is for illustrative purposes only and should not be considered a limitation of the present invention.

Figure 1A:
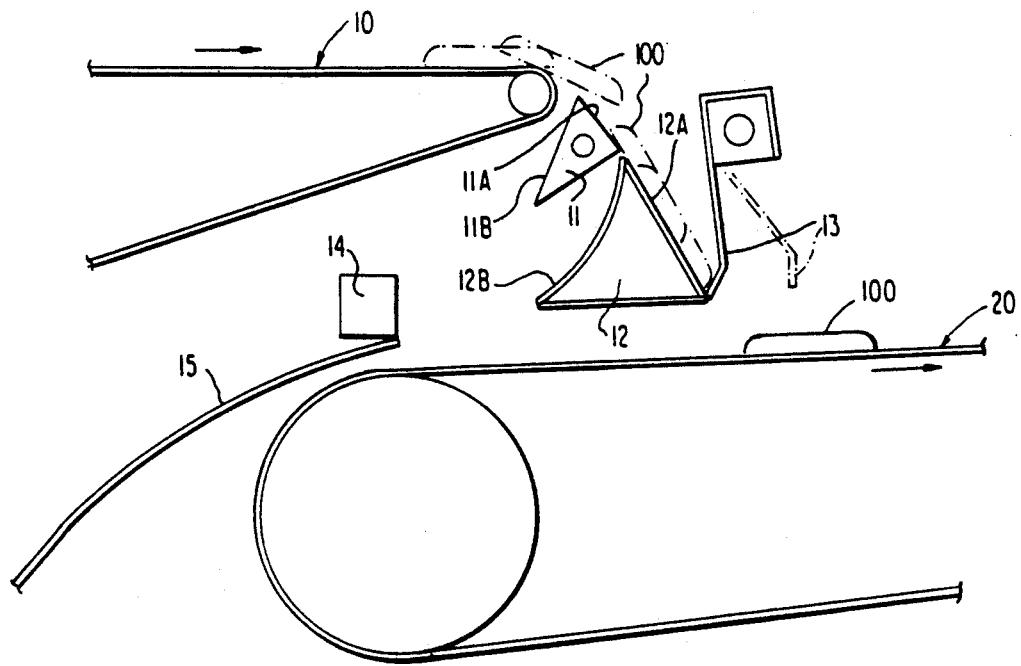
FIG. 1A illustrates a cross-sectional view of an apparatus in the slide position according to the preferred embodiment of the invention.

Referring to FIG. 1A, there is shown a cross-sectional view of an apparatus according to the present invention. The apparatus receives a stream of food items, such as cookies 100, which are deposited with a top surface facing upward following baking or other food processing steps at an infeed section, preferably an endless loop conveyor belt 10. The conveyor belt 10 transports the cookies 100 to the apparatus of the present invention.

Preferably, the apparatus is used in conjunction with an automatic cookie sandwich making system, such as the well-known COOKIE CAPPER TM sandwich system, that requires every other row of cookies 100 to be conveyed to a filling station (not shown) with their bottom surfaces facing upward. The bottom surface receives a cookie filling substance deposited on the surface by the filling station. The filling station may be any such station as is well-known in the art, for example, the station may be that shown in U.S. Pat. No. 4,194,443, which is hereby incorporated by reference.

After the cookies 100 pass the filling station, every other row, having the cookie top surfaces facing upward, is picked up at a capping station, such as that shown in U.S. Pat. No. 4,194,443 or equivalent, and subsequently placed on the row of cookies having filling substance deposited thereon.

With an automatic cookie sandwich system as described above, the apparatus of the present invention operates in two positions. In a slide position, as shown in FIG. 1A, a slide mechanism 11 is positioned beneath the edge of infeed conveyor belt 10. In particular, the mechanism 11 has a primary slide surface 11A that is positioned to form an angle with the horizontal plane of the conveyor belt 10 such that when the stream of cookies 100 reaches the edge thereof, row by row the cookies 100 drop off the conveyor belt 10 and slide down the primary slide surface 11A towards a transport mechanism 20. The primary slide surface 11A guides each cookie 100 to a secondary slide surface 12A formed on second slide mechanism 12. The slide surface 12A is positioned such that it is within the same surface plane as primary slide surface 11A. The cookie 100 then slides down surface 12A until its motion is stopped by snubber bar 13 that forms a junction with the lower edge of the slide surface 12A.

The snubber bar 13 has a horizontal extent that spans the entire width of the slide mechanism 12 and the transport mechanism 20. The bar 13 is pivotally mounted on a shaft or the like such that it may be rotated in a counter-clockwise direction. When the snubber bar 13 is so rotated, the cookie 100, having been registered in position at the junction formed by bar 13 and surface 12A, falls of its own weight onto the horizontal surface of the transport mechanism 20. The transport mechanism 20 is used to transport the cookies 100 to the filling and capping stations; preferably, the mechanism is an endless loop conveyor belt. The snubber bar 13 provides the control necessary to accurately deposit the cookie 100 onto the transport mechanism.

Figure 1B:
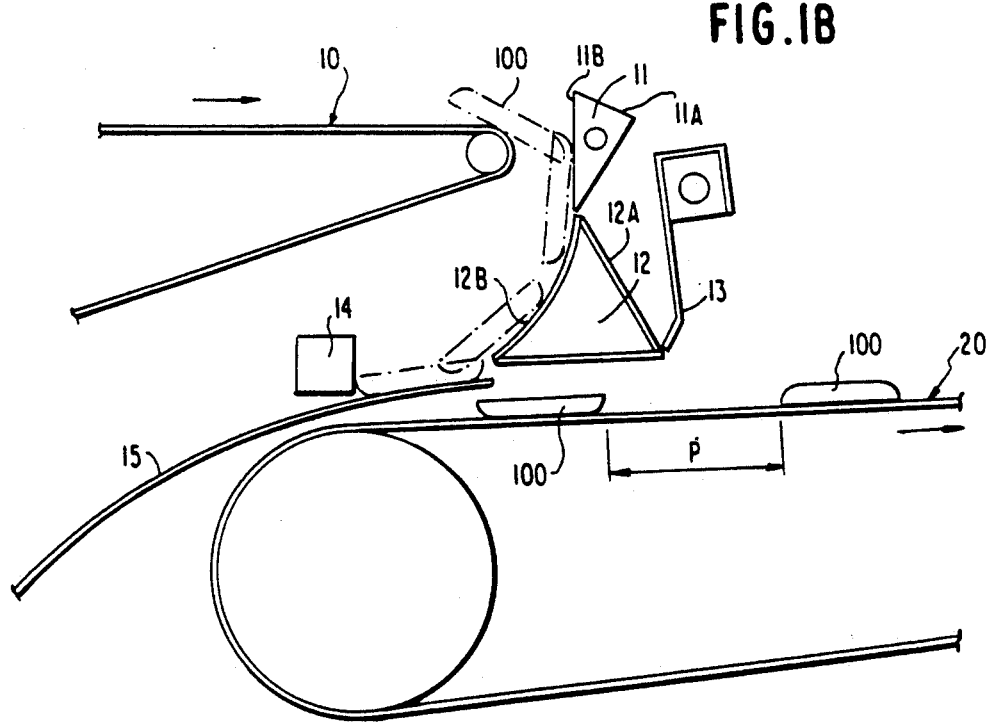
FIG. 1B illustrates a cross-sectional view of an apparatus in the flip position according to the preferred embodiment of the invention.

In the flip position, as shown in FIG. 1B, the apparatus of the present invention causes the slide mechanism 11 to be raised and tilted such that it penetrates the horizontal plane of conveyor belt 10. In this manner, the stream of cookies reaching the edge of belt 10 will come into contact with the slide mechanism 11. In particular, the slide mechanism 11 has an abutting surface 11B that is constructed so as to receive the cookies 100, row by row, as they drop off the belt 10. The abutting surface retards the forward motion of each cookie 100 and guides it downward towards a reverse slide surface 12B of the second slide mechanism 12.

Each cookie 100 that drops off the conveyor belt 10 and slides down the reverse slide surface 12B slides on its top surface. A bump bar 14 is provided in a position directly above the surface of the transport mechanism 20, and serves as a retarding surface for stopping the motion of each cookie 100 that slides down the reverse slide surface 12B. As with the snubber bar 13, the bump bar 14 provides the necessary control to accurately deposit the cookie 100 onto the transport mechanism, chiefly because it retards the forward movement of the cookie 100 as the cookie slides down the reverse slide surface 12B.

In the preferred embodiment, a pull-slide plate 15 is positioned directly below the bar 14 so as to form a junction therewith at the bottom portion of the reverse slide 12B. Each cookie 100 falling down the slide 12B comes into contact with the bump bar 14 and comes to rest at the junction formed by the bar 14 and the plate 15. The pull-slide plate 15 is slideably moveable by an actuating device, such as an air-cylinder or the like (as will be described in detail below), such that it can be retracted to a position behind the extent of the bump bar 14. By retracting the plate 15 in this manner, the cookie 100 positioned at the aforementioned junction is released and allowed to fall downward onto the surface of the transport mechanism 20. The pull-slide plate 15 thus described increases the control over the deposit of cookie 100 on the transport mechanism.

Figure 2B:
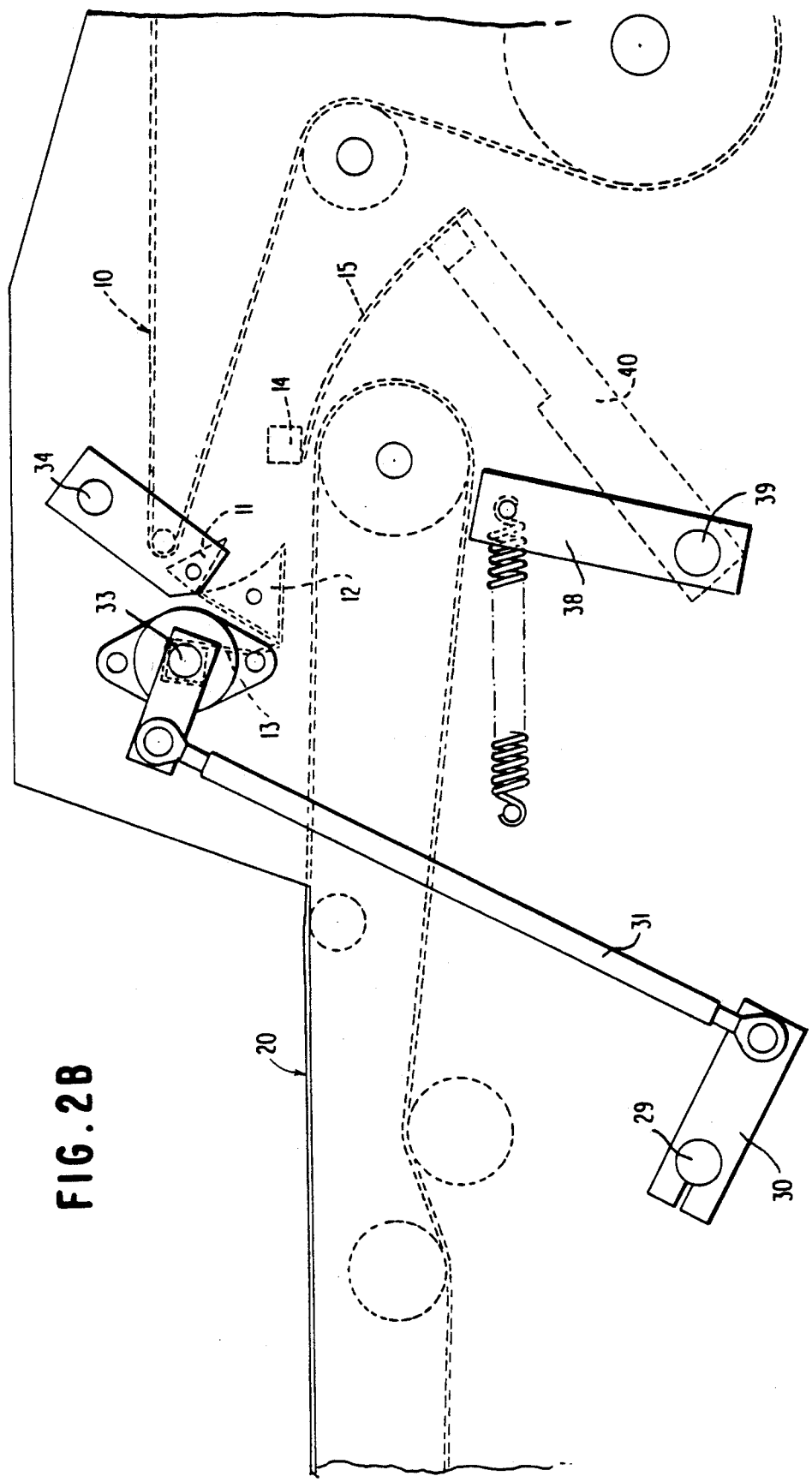
Figure 3A:
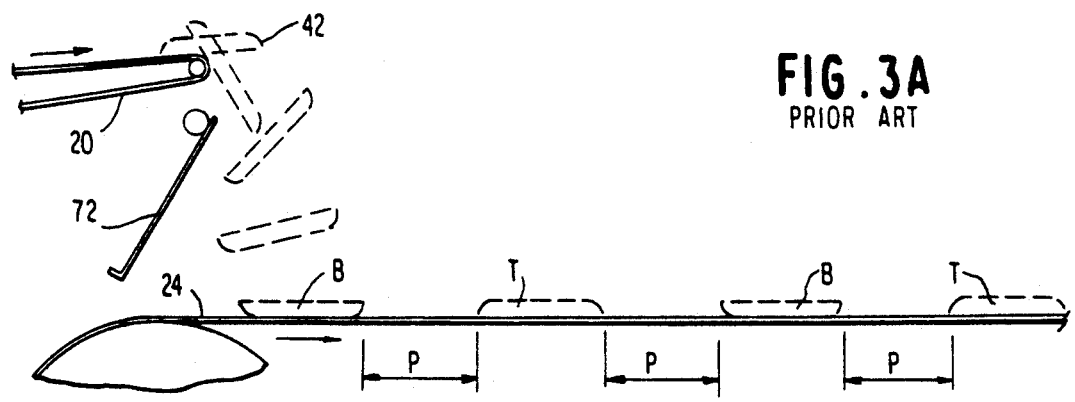
FIGS. 3A and 3B illustrate cross-sectional views of flip and slide positions, respectively, of the well-known COOKIE CAPPER TM sandwich system.
Figure 3B:
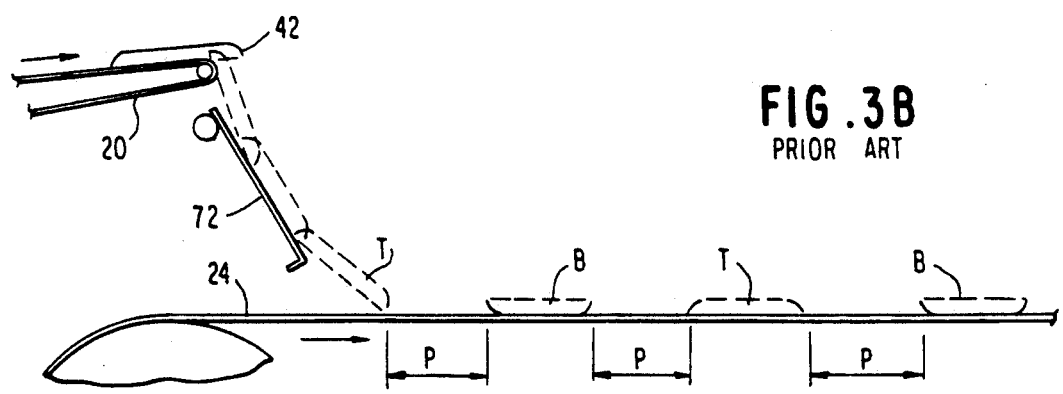
Figure 4:
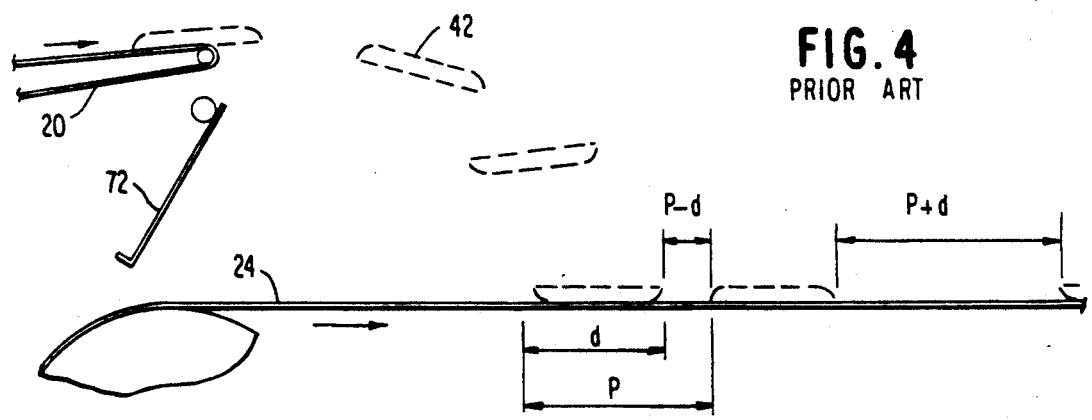
FIG. 4 illustrates a cross-sectional view of the system shown in FIGS. 3A and 3B during a high-speed run.

FIGS. 2A and 2B illustrate cross-sectional views of one mechanism that may be used to control the operation of the apparatus of the present invention as described above. More specifically, in order to raise and lower the slide mechanism 11 into the flip and slide positions, the mechanism 11 is connected at opposite ends to one arm of bell crank levers 22. The bell crank levers 22 are pivotally mounted on the frame of the apparatus by pivot shaft 34 and an operating link 21 is connected to the other arm of one of the bell crank levers 22. The opposite end of the link 21 is connected to a cam follower lever 23 which is in turn pivoted to the frame. A roller 24 is rotatably mounted at the free end of the cam follower lever 23 and is maintained in engagement with the surface of cam 25. The cam 25 is mounted on and rotatably driven by shaft 36, which in turn, is driven by a drive motor (not shown) or other suitable means known in the art. The cam 25 is provided with the appropriate number of cam lobes so that for each complete revolution of the cam 25 the slide mechanism 11 will be raised and lowered to alternately flip and slide the required number of cookies 100.

Mounted beneath the end of the second slide surface 12A is the elongated snubber bar 13 which extends across the entire width of both belts 10 and 20, as well as across the width of the slide surface 12A. The snubber bar 13 is mounted on a pivot shaft 33, which is rotatably mounted at opposite ends in the frame. An actuator arm 32 is connected to either end (or both ends) of the shaft 33 and a link 31 is pivotally connected to the arm 32. The opposite end of the link 31 is connected to a cam follower lever 26 which is pivoted about the same pivot pin as the cam follower lever 23. A suitable roller 35 similar to the roller 24 is mounted on the cam follower lever 26 and maintained in engagement with the periphery of cam 25. The cam 25 is provided with a lobe which will provide for a single cycle of operation for the snubber bar 13 during the period in which the slide mechanism 11 is alternately raised up and wown. A spring mechanism (not shown) acts as a biasing means for biasing the cam follower levers 23 and 26 against the cam 25.

An air cylinder or similar actuator 37 includes a piston rod which is reciprocally movable and is connected in a suitable fashion to an actuating lever 38. The lever 38 is reciprocally movable with shaft 39 so as to actuate an arm 40. Actuation of the air cylinder 37 causes movement of the lever 38, which in turn moves the arm 40 so that the pull-slide plate 15 is retracted to a position behind the bump bar 14.

The various cam shafts and other linkage mechanisms shown in FIGS. 2A and 2B are all driven in timed relation in a conventional manner and the orientation of the cams and cranks on the shafts are such as to accomplish the timing of events described in the operation of the apparatus above, again in a conventional manner.

It should be noted that both the pull-slide plate 15 and the snubber bar 13 (FIG. 1A) can be actuated in timed relation so that the cookies 100 resting at their respective junctions can be deposited on the transport mechanism 20. By appropriately controlling the timing of retraction of the pull-slide plate 15 and the rotation of the snubber bar 13 (FIG. 1A), the apparatus of the invention can control both the slide and the flip process of an automatic sandwich system such that the distance between the top and bottom cookies within a stream (i.e., corresponding to slid and flipped cookies, respectively) can be a regular distance "P," irrespective of the speed of the run. Accordingly, an automatic sandwich manufacturing system, such as the COOKIE CAPPER TM sandwich system, can be operated at high-speeds without being inhibited by the problems of overshoot and the like found in the prior art (as discussed above).

While the invention has been particularly shown and described with reference to a preferred embodiment thereof, it will be understood that various changes in form and detail may be made therein without departing from the spirit and scope of the invention. For example, the actuating devices used to position the sliding mechanism 11, the snubber bar 13, and the pull-slide 15 need not be purely mechanical structures as herein described. Furthermore, non-essential elements may be removed from the apparatus if so desired without detracting from the advantages derived from the unique invention disclosed herein.

Although the present invention has been described with respect to food items such as cookies, and the like, it is obvious that the novel apparatus could readily be utilized for analogous operations, not only in food processing, but in manufacturing operations and the like.

What is claimed is:

1. An article flipping apparatus comprising:
   a primary slide member alternately moveable to slide or flip, respectively, an article transported by an infeed conveyor unit;
   a reverse slide member for receiving a flipped article and guiding the article's movement as it slides down a surface thereof;
   a flip stopping unit for stopping the flipped article's movement so that the article is registered in a given position for transport on an outfeed conveyor unit; and
   a second slide member for receiving a slid article and guiding the article's movement as it slides down a surface thereof, wherein the respective movements of both said slid articles and said flipped articles are controlled so that said articles are deposited on said outfeed conveyor unit in a registered relationship.

2. The article flipping apparatus of claim 1, further comprising a slide stopping unit for stopping the slid article's movement down the surface of the second slide member so that the article is in a given position relative to the flipped article, wherein the slid article comes to rest in a registered position at a junction between said second slide member and said slide stopping unit, said slide stopping unit being rotatably moveable so as to deposit a slid article on the outfeed conveyor so that its position on the outfeed conveyor unit is within a prescribed distance from a flipped article.

3. The article flipping apparatus of claim 2, further comprising:
   a plate, slidably coupled to said flip stopping unit, forming a plane generally above the outfeed conveyor unit, wherein the flipped article comes to rest in a registered position at a junction formed by said flip stopping unit and said plate.

4. The flipping apparatus of claim 3, wherein said flip stopping unit and said plate are moveable in timed relation so that the slid and flipped articles are allowed to drop onto the outfeed conveyor in registered positions.

5. The article flipping apparatus of claim 4, wherein said articles are food items.

6. A process of automatically flipping articles, comprising the steps of:
   conveying a plurality of rows of articles transversely across a first plane;
   alternately inhibiting and allowing to pass said articles being conveyed across said first plane, wherein during said inhibiting, the articles are forced to slide down a surface on their top surfaces, reltive to their orientation on the first plane, and wherein in said allowing-to-pass step, the articles are allowed to slide on their bottom surfaces;

retarding the respective movements of the articles either inhibited or allowed to pass, and guiding the articles into a registered position; and conveying the articles thus registered transversely across a second plane in their registered positions relative to each other.

7. A process of automatically flipping articles, comprising the steps of:

conveying a plurality of rows of articles transversely across a first plane;

alternately flipping and sliding ones of said rows of articles, wherein during said flipping step, the articles are forced to slide down a surface on their top surfaces, relative to their orientation on the first plane, and during said sliding step, the articles are allowed to slide down a surface on their bottom surfaces; and timing the movements of the articles either flipped or slid, and guiding the articles into a registered position so that the articles thus registered are transversely conveyed across a second plane in successive rows at constant intervals.

* * * * *